United States Patent
Chu et al.

(10) Patent No.: US 7,667,530 B2
(45) Date of Patent: Feb. 23, 2010

(54) CHARGE PUMP DOWN CIRCUIT AND METHOD FOR THE SAME

(75) Inventors: Kwan-Jen Chu, HsinChu (TW); Shui-Mu Lin, Taichung County (TW); Jien-Sheng Chen, Toufen Town (TW); Tsung-Wei Huang, Taipei (TW)

(73) Assignee: Richtek Technology Corporation, Hsin-Chu (TW)

( * ) Notice: Subject to any disclaimer, the term of this patent is extended or adjusted under 35 U.S.C. 154(b) by 22 days.

(21) Appl. No.: 12/041,102

(22) Filed: Mar. 3, 2008

(65) Prior Publication Data

US 2009/0219078 A1    Sep. 3, 2009

(51) Int. Cl.
*G05F 1/10* (2006.01)
*G05F 3/02* (2006.01)

(52) U.S. Cl. ...................................... 327/536; 327/306

(58) Field of Classification Search ................. 327/536; 363/59, 60
See application file for complete search history.

(56) References Cited

U.S. PATENT DOCUMENTS 6,169,673 B1 * 1/2001 McIntyre et al. .............. 363/59

* cited by examiner

*Primary Examiner*—Lincoln Donovan
*Assistant Examiner*—Daniel Rojas
(74) *Attorney, Agent, or Firm*—Tung & Associates

(57) ABSTRACT

The present invention discloses a charge pump down circuit which comprises three capacitors operating in three time phases. In the first time phase, the total of the voltages across the three capacitors is equal to an input voltage; in the second time phase, the voltage across the second capacitor is equal to the voltage across the third capacitor; in the third time phase, the difference between the voltages across the first and the second capacitors is equal to the voltage across the third capacitor, wherein the voltage across the third capacitor is the output voltage of the charge pump down circuit.

9 Claims, 2 Drawing Sheets

Phase-I  Fig. 3A

Phase-II

Phase-III

CHARGE PUMP DOWN CIRCUIT AND METHOD FOR THE SAME

FIELD OF INVENTION

The present invention relates to a charge pump down circuit, in particular to a charge pump down circuit capable of providing multiple output/input ratios with less number of capacitors, and a corresponding method.

DESCRIPTION OF RELATED ART

Conventionally, if it is intended to provide an output voltage Vout as one-fourth of an input voltage Vin, i.e., Vout=(¼) Vin, four capacitors are required in a charge pump down circuit, as shown in FIGS. 1A and 1B. The circuit switches between two time phases to generate an output voltage Vout as one-fourth of the input voltage Vin. This prior art circuit has the drawbacks that it requires relatively more number of capacitors, but is only capable of generating one single output.

The present invention is more flexible because it is capable of providing multiple output/input ratios by relatively less number of capacitors.

SUMMARY

A first objective of the present invention is to provide a charge pump down circuit capable of providing multiple outputs with less number of capacitors.

A second objective of the present invention is to provide a charge pump down method.

In accordance with the foregoing and other objectives of the present invention, and from one aspect of the present invention, a charge pump down circuit comprises three capacitors operating in three time phases: in the first time phase, the total of the voltages across the three capacitors being equal to an input voltage; in the second time phase, the voltage across the second capacitor being equal to the voltage across the third capacitor; in the third time phase, the difference between the voltages across the first and the second capacitors being equal to the voltage across the third capacitor, wherein the voltage across the third capacitor is the output voltage of the charge pump down circuit.

The three time phases can be arranged in any order.

From another aspect of the present invention, a charge pump down circuit comprises: an input terminal, an output terminal, and three capacitors, wherein the anode of the first capacitor is electrically connected with the input terminal through a first switch; the anode of the first capacitor is electrically connected with the anode of the second capacitor through a second switch; the cathode of the first capacitor is electrically connected with the anode of the second capacitor through a third switch; the cathode of the first capacitor is electrically connected with the cathode of the second capacitor through a fourth switch; the anode of the second capacitor is electrically connected with the anode of the third capacitor through a fifth switch; the cathode of the second capacitor is electrically connected with the anode of the third capacitor through a sixth switch; the cathode of the second capacitor is electrically connected with the cathode of the third capacitor through a seventh switch; and the cathode of the third capacitor is electrically connected to ground.

Preferably, the charge pump down circuit described above further comprises an eighth switch electrically connecting the cathode of the first capacitor to ground, or a ninth switch electrically connecting the anode of the first capacitor with the anode of the third capacitor.

From yet another aspect of the present invention, a charge pump down method comprises: providing three capacitors; in a first time phase, making the total of the voltages across the three capacitors to be equal to an input voltage; in a second time phase, making the voltage across the second capacitor to be equal to the voltage across the third capacitor; and in the third time phase, making the difference between the voltages across the first and the second capacitors to be equal to the voltage across the third capacitor, wherein the voltage across the third capacitor is the output voltage.

From a still other aspect of the present invention, a charge pump down method comprises: providing an input terminal, an output terminal, and three capacitors; electrically connecting two or more of the three capacitors in different ways in different time phases; and making the voltage across one of the three capacitors to be (¼) of a voltage at the input terminal by the different ways of connection.

It is to be understood that both the foregoing general description and the following detailed description are provided as examples, for illustration but not for limiting the scope of the invention.

BRIEF DESCRIPTION OF THE DRAWINGS

These and other features, aspects, and advantages of the present invention will become better understood with regard to the following description, appended claims, and accompanying drawings.

FIGS. 3A-3C explain how the present invention obtains Vout=(¼)Vin.

DESCRIPTION OF THE PREFERRED EMBODIMENTS

Figure 1A:
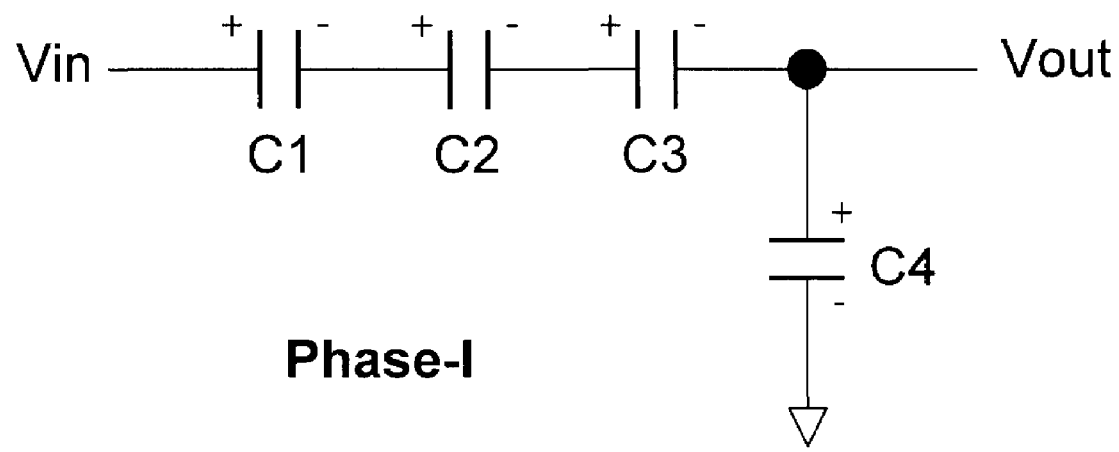
FIGS. 1A and 1B show how a conventional circuit obtains Vout=(¼)Vin by four capacitors and two time phases.
Figure 1B:
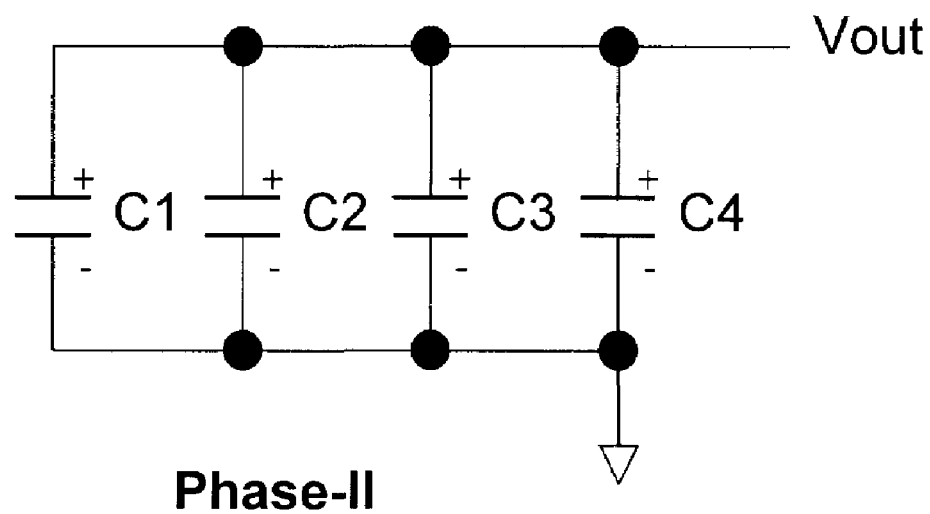
Figure 2:
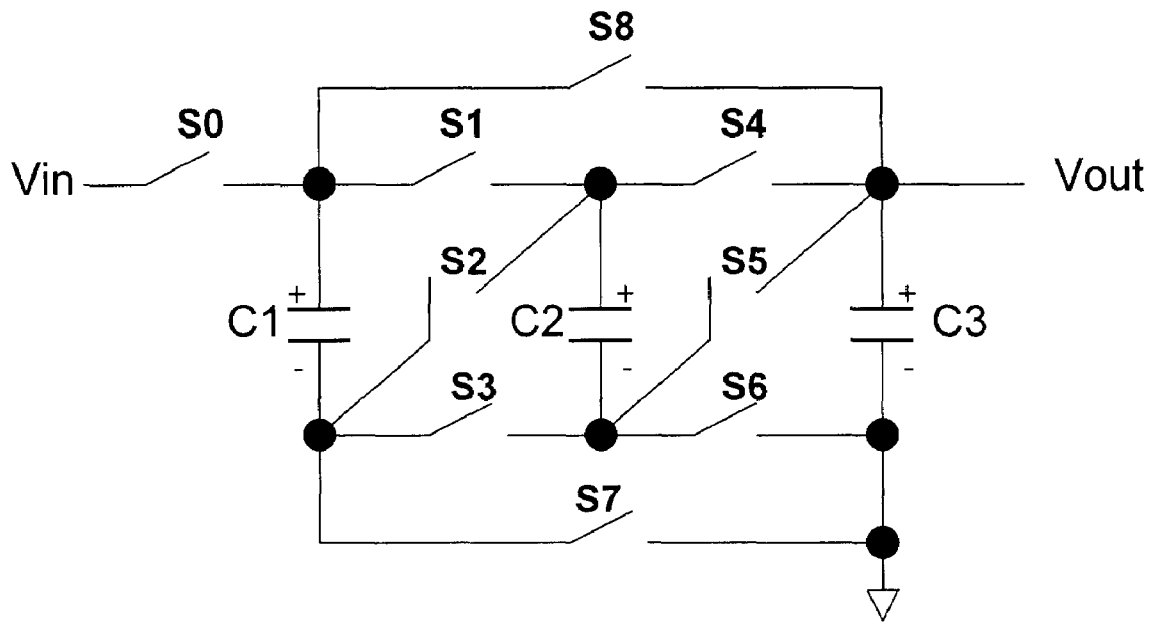
FIG. 2 is a circuit diagram showing an embodiment of the present invention.

FIG. 2 shows a circuit diagram of the charge pump down circuit according to an embodiment of the present invention. This embodiment requires only three capacitors to generate an output of one-fourth of the input voltage, i.e., Vout=(¼) Vin. Moreover, the output voltage can be adjusted to be equal to 1X, (½)X, (⅓)X, (¼)X, (⅔)X of Vin, where "X" means one multiple.

Figure 3B:
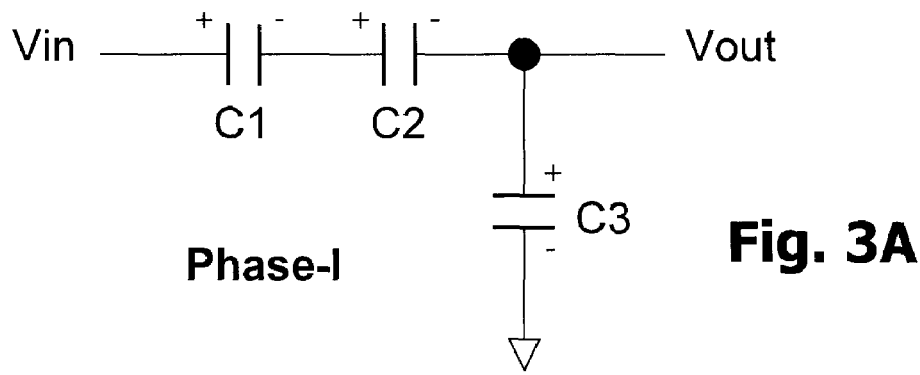
Figure 3B:
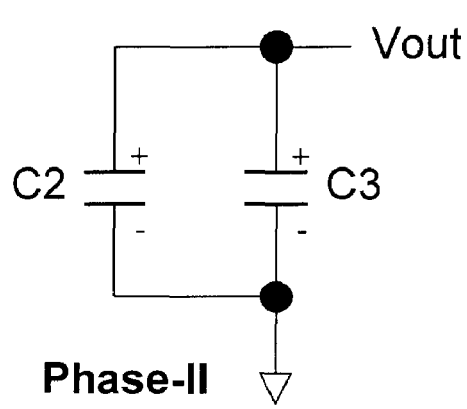
Figure 3C:
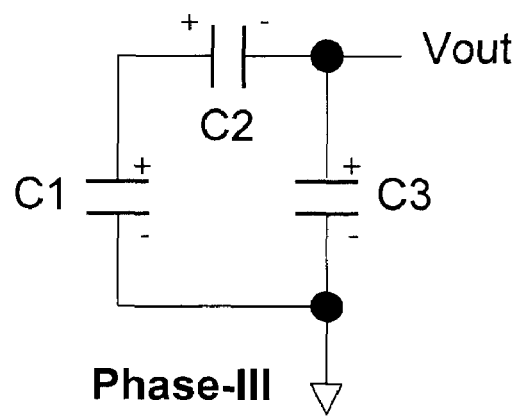

To explain the operation of the circuit, please refer to FIGS. 3A-3C, and taking Vout=(¼)Vin as the first example. In this case, the circuit needs to switch among three time phases: in the first time phase, C1+C2+C3=Vin; in the second time phase, C2=C3; and in the third time phase, C1−C2=C3. It can be obtained from the above three equations that C3=(¼)Vin, and thus Vout=(¼)Vin if the voltage across the capacitor C3 is set to be the output voltage Vout.

Referring to FIGS. 3A-3C in conjunction with FIG. 2, to obtain Vout=(¼)Vin, the operation of the switches in the three phases are as follows:

First time phase: switches S0, S2, and S5 ON, rest OFF
Second time phase: switches S4 and S6 ON, rest OFF
Third time phase: switches S1, S5, and S7 ON, rest OFF Note that the three time phases need not follow such order: first time phase→second time phase→third time phase. The order can be in any sequence, such as third time phase→second time phase→first time phase, or any other way.

The above operation does not require the switch S8, and thus if it is only required to generate an output of (¼)Vin, and no other outputs are required, the switch S8 can be omitted.

In similar manners, the circuit of FIG. 2 can generate other outputs as below:

Vout=Vin (only one time phase is required) Switches S0, S1, and S4 ON, rest OFF

Vout=(½)Vin (only two time phases are required)
First time phase: switches S0, S1, S3, and S5 ON, rest OFF
Second time phase: switches S1, S3, S4, and S6 ON, rest OFF Vout=(⅓)Vin (only two time phases are required)
First time phase: switches S0, S2, and S5 ON, rest OFF
Second time phase: switches S1, S3, S4, and S6 ON, rest OFF Vout=(¼)Vin (three time phases are required, as described above)
First time phase: switches S0, S2, and S5 ON, rest OFF
Second time phase: switches S4 and S6 ON, rest OFF
Third time phase: switches S1, S5, and S7 ON, rest OFF Vout=(⅔)Vin (only two time phases are required)
First time phase: switches S0, S1, S3, and S5 ON, rest OFF
Second time phase: switches S2, S6, and S8 ON, rest OFF It can be seen from the foregoing that some of the paths and switches can be omitted from the circuit if the circuit is to be applied to provide limited outputs. For example, the switch S7 is only used in the case for generating Vout=(¼)Vin, and the switch S8 is only used in the case for generating Vout=(⅔)Vin. Therefore, these switches and corresponding paths can be omitted if such outputs are not required.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, some of the paths and switches can be omitted from the circuit, or connected in an alternative way. In view of the foregoing, it is intended that the present invention cover all such and other modifications and variations, which should be interpreted to fall within the scope of the following claims and their equivalents.

What is claimed is:

1. A charge pump down circuit comprising a group of capacitors consisting of a first, a second and an output capacitors operating in cycles wherein each cycle has three time phases; in the first time phase, the total of the voltages across the three capacitors being equal to an input voltage; in the second time phase, the voltage across the second capacitor being equal to the voltage across the output capacitor; in the third time phase, the difference between the voltages across the first and the second capacitors being equal to the voltage across the output capacitor, wherein the voltage across the output capacitor is the output voltage of the charge pump down circuit and is ¼ of the input voltage.

2. A charge pump down circuit comprising an input terminal, an output terminal, and a group of capacitors consisting of a first, a second and an output capacitors, wherein the anode of the first capacitor is electrically connected with the input terminal through a first switch; the anode of the first capacitor is electrically connected with the anode of the second capacitor through a second switch; the cathode of the first capacitor is electrically connected with the anode of the second capacitor through a third switch; the cathode of the first capacitor is electrically connected with the cathode of the second capacitor through a fourth switch; the anode of the second capacitor is electrically connected with the anode of the output capacitor through a fifth switch; the cathode of the second capacitor is electrically connected with the anode of the output capacitor through a sixth switch; the cathode of the second capacitor is electrically connected with the cathode of the output capacitor through a seventh switch; the anode of the output capacitor is directly connected with the output terminal; and the cathode of the output capacitor is electrically connected to ground.

3. The charge pump down circuit of claim 2, wherein the cathode of the first capacitor is electrically connected to ground through an eighth switch.

4. The charge pump down circuit of claim 2, wherein the anode of the first capacitor is electrically connected with the anode of the output capacitor through a ninth switch.

5. The charge pump down circuit of claim 3, wherein the charge pump down circuit operates in cycles wherein each cycle has three time phases: in the first time phase, the three capacitors being all connected in series; in the second time phase, the second capacitor and the output capacitor being connected in parallel; in the third time phase, the anode of the first capacitor is electrically connected with the anode of the second capacitor, and the output capacitor is electrically connected between the cathode of the first capacitor and the cathode of the second capacitor.

6. The charge pump down circuit of claim 2, wherein the anode of the first capacitor is electrically connected with the anode of the output capacitor through a ninth switch; the cathode of the first capacitor is electrically connected to ground through an eighth switch; and the output voltage of the charge pump down circuit is 1X, (½)X, (⅓)X, (¼)X, or (⅔)X of its input voltage.

7. A charge pump down method comprising the steps of:
providing a group of capacitors consisting of a first, a second and an output capacitors operating in cycles wherein each cycle has three time phases;
in a first time phase, making the total of the voltages across the three capacitors to be equal to an input voltage;
in a second time phase, making the voltage across the second capacitor to be equal to the voltage across the output capacitor; and
in the third time phase, making the difference between the voltages across the first and the second capacitors to be equal to the voltage across the output capacitor,
wherein the voltage across the output capacitor is the output voltage and ¼ of the input voltage.

8. A charge pump down method comprising the steps of:
providing an input terminal, an output terminal, and a group of capacitors consisting of a first, a second and an output capacitors;
electrically connecting two or more of the three capacitors in different ways in different time phases; and
making the voltage across the output capacitor to be (¼) of a voltage at the input terminal by the different ways of connection.

9. The charge pump down method of claim 8, wherein the voltage across the one capacitor is adjustable to be equal to one or more of the following; 1 multiple of the voltage at the input terminal, (½) multiple of the voltage at the input terminal, (⅓) multiple of the voltage at the input terminal, and (⅔) multiple of the voltage at the input terminal.

* * * * *